United States Patent [19]
Vreeken et al.

[11] Patent Number: 5,829,317
[45] Date of Patent: Nov. 3, 1998

[54] BRAKE PEDAL ASSEMBLY

[75] Inventors: Percy P. Vreeken, Grosse Pointe Farms; Timothy J. Nixon, Shelby Township, both of Mich.; Michael A. Barnes, Ringgold, Pa.

[73] Assignee: TransNav, Inc., New Baltimore, Mich.

[21] Appl. No.: 779,565

[22] Filed: Jan. 7, 1997

[51] Int. Cl.⁶ .................................................. G05G 1/14
[52] U.S. Cl. ............................ 74/560; 74/512; 384/296
[58] Field of Search ........................... 74/560, 512, 513; 384/296, 295, 275

[56] References Cited

U.S. PATENT DOCUMENTS

| | | | |
|---|---|---|---|
| 1,849,963 | 3/1932 | Snow | 384/296 |
| 2,226,424 | 12/1940 | Bullock | 74/560 |
| 3,451,288 | 6/1969 | Barton et al. | 74/512 |
| 3,911,760 | 10/1975 | Elbers et al. | 74/512 |
| 4,130,027 | 12/1978 | Leighton | 74/512 |
| 4,790,672 | 12/1988 | Komplin | 384/296 X |
| 5,216,928 | 6/1993 | Kodachi | 384/296 X |
| 5,588,338 | 12/1996 | Carr et al. | 74/560 |

FOREIGN PATENT DOCUMENTS 3161813  7/1991  Japan ........................................ 74/560

*Primary Examiner*—Rodney H. Bonck
*Assistant Examiner*—Mary Ann Battista
*Attorney, Agent, or Firm*—Harness, Dickey & Pierce, P.L.C.

[57] ABSTRACT

A unitary brake pedal spacer for use in a brake pedal assembly. The brake pedal assembly includes a brake pedal having a tubular section which is attached between two opposing side walls of a brake pedal bracket. The brake pedal spacer is inserted within the interior of the tubular section, and the tubular section is then inserted between a pair of opposing apertures formed in the sidewalls of the brake pedal bracket. A shoulder bolt is inserted through the brake pedal spacer and a nut is threaded onto an end of the shoulder bolt to secure the assembly. The brake pedal spacer is a unitary apparatus which provides both spacer and bushing functionality for the assembly.

12 Claims, 3 Drawing Sheets

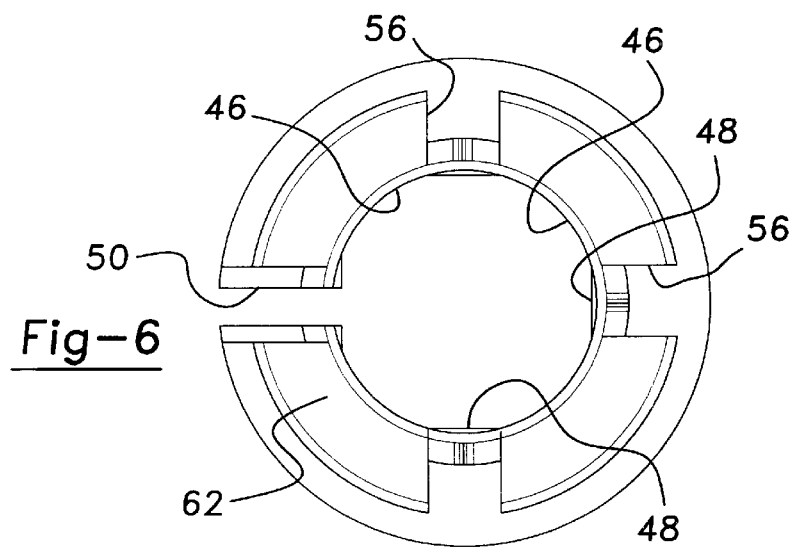
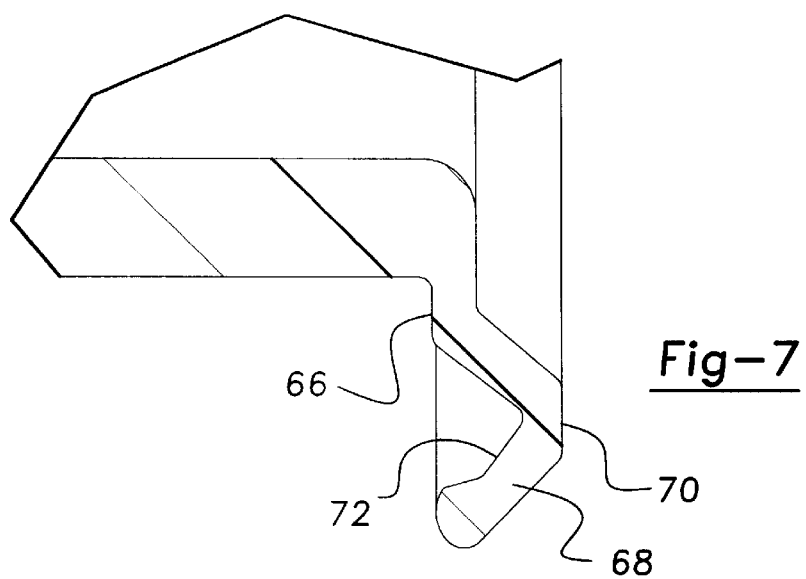

BRAKE PEDAL ASSEMBLY

TECHNICAL DESCRIPTION

This invention relates generally to a brake pedal assembly for a vehicle and, more particularly, to a brake pedal assembly having a unitary spacer and bushing which facilitates assembly of the brake pedal assembly and improves the operation of the pedal.

BACKGROUND OF THE INVENTION

In a typical brake pedal assembly, a generally vertical member extends from the foot pedal of the assembly and attaches to a brake pedal bracket. A horizontal, tubular member is attached to the vertical member at the end opposite the foot pedal. In order to attach the brake pedal to the bracket using the tubular member, a bushing is inserted into the interior of the tubular member. A pair of spacers are then inserted between the bushing and the inner wall of the tubular member at each end of the tubular member. The spacers enable relative rotation between the tubular member and the bushing. The assembly is then inserted between mounting holes formed in opposing sidewalls of the bracket, and a bolt is then inserted through a first mounting hole, through the bushing, and through the second mounting hole. A washer is then placed on the threaded end of the bolt, and a nut is threaded onto the bolt and tightened to finalize the assembly process.

Several disadvantages exist in existing brake pedal assemblies. First, prior to inserting the tubular member between the sidewalls of the brake pedal bracket, the assembly operator must insert three parts, one bushing and two spacers, into the tubular member. This operation requires valuable assembly time which could be streamlined by reducing the number of parts. Second, once the three parts have been inserted into the tubular member, the tubular member must then be placed between the side walls of the bracket. When positioning the tubular member between the opposing sidewalls of the bracket, the operator must hold the two spacers in place on the tubular member in order to prevent them from inadvertently falling out. If a part falls out, the operator must then stop, obtain the requisite replacement parts, insert the replacement parts and again attempt to place the tubular member between the opposing sidewalls of the bracket. Third, prior to tightening, the operator also places a washer on the threaded end of the bolt prior to threading and tightening the nut. This introduces yet another step during the assembly process. Finally, when the bolt is inserted through the tubular member/bushing sub-assembly and tightened, the operator tightens the bolt to a predetermined torque specification. During tightening, because there is no stop for the nut, the assembly can be over-tightened. Over-tightening may adversely effect the operation of the brake pedal assembly.

In view of the foregoing, it is an object of the present invention to provide a brake pedal assembly having fewer parts than the assemblies found in the prior art.

It is a further object of the present invention to provide a brake pedal assembly which requires a minimum of operations in order to assemble the brake pedal assembly.

It is yet a further object of the present invention to provide a unitary brake pedal spacer/bushing which combines the bushing and two spacer components into a unitary part.

It is yet a further object of the present invention to provide a brake pedal assembly having a brake pedal spacer which remains installed once inserted into the tubular member of the brake pedal.

It is yet a further object of the present invention to provide a brake pedal assembly having a brake pedal spacer which maintains tension upon the tubular member of the brake pedal once the brake pedal is installed onto the bracket.

It is yet a further object of the present invention to provide a brake pedal assembly having a bolt which limits how much the retaining nut can be tightened onto the bolt in order to prevent over-tightening of the brake pedal assembly.

SUMMARY OF THE INVENTION

In accordance with the principles of the present invention, a vehicle brake pedal assembly includes a bracket having a pair of opposing apertures formed therein. A brake pedal includes a foot pad and a rigid member extending from the foot pad. At the end of the rigid member opposite the foot pad, a cylindrical bore is attached. A brake pedal spacer is inserted into the cylindrical bore so that the brake pedal spacer and the cylindrical bore generally share a common axis. A shoulder bolt is then passed through the apertures of the brake pedal bracket and the brake pedal spacer and is secured to the bracket.

Additional objects, features and advantages of the present invention will become apparent from the following description and the appended claims, taken in connection with the accompanying drawings.

BRIEF DESCRIPTION OF THE DRAWINGS

In the drawings, which form an integral part of the specification and are to be read in conjunction therewith, like reference numerals are employed to designate identical components in the various views:

FIG. 6 is an end view of the entry end of the brake pedal spacer of FIG. 3; and

FIG. 7 is an expanded view of the end stop of the brake pedal spacer indicated by the circle 7 in FIG. 5.

DETAILED DESCRIPTION OF THE INVENTION

Figure 1:
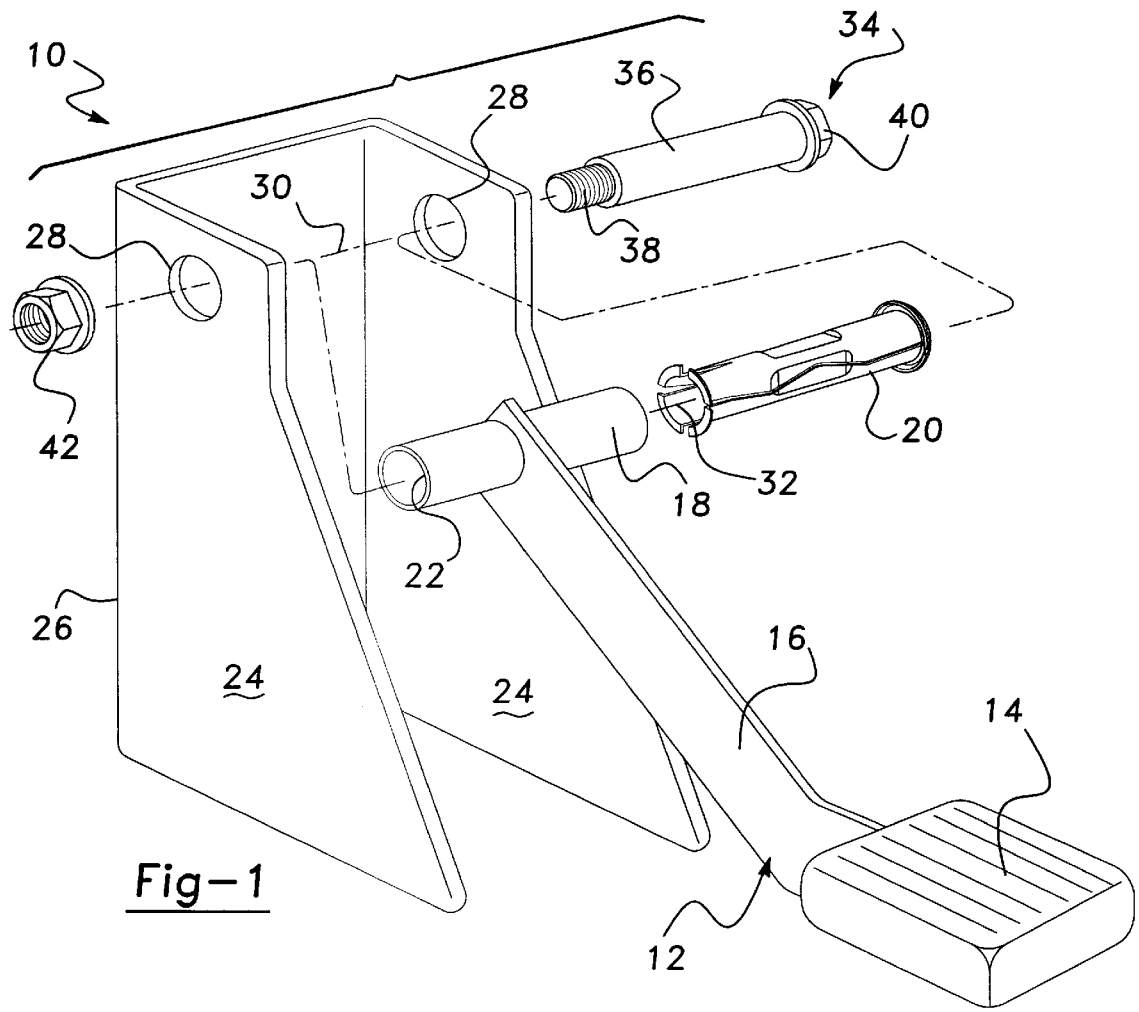
FIG. 1 is an exploded view of the brake pedal assembly arranged in accordance with the principles of the present invention.

With reference to FIG. 1, FIG. 1 is an exploded view of the brake pedal assembly 10. Brake pedal assembly 10 includes a brake pedal 12 having at one end a foot pad 14. A support member 16 extends from foot pad 14 and connects at the end opposite foot pad 14 to a cylindrical tube 18. Cylindrical tube 18 receives a brake pedal spacer 20 which is inserted into the interior 22 of cylindrical tube 18. When brake pedal spacer 20 is inserted into cylindrical tube 18, cylindrical tube 18 and brake pedal spacer 20 are then inserted between a pair of sidewalls 24 of brake pedal bracket 26. A pair of apertures 28 is formed in each side wall 24. Apertures 28 share a common axis 30, and cylindrical tube 18 and brake pedal spacer 20 share a common axis 32. Axes 30 and 32 are then aligned so that a shoulder bolt 34 may be inserted through a first one of apertures 28, brake pedal spacer 20, and the other aperture 28.

Figure 2:
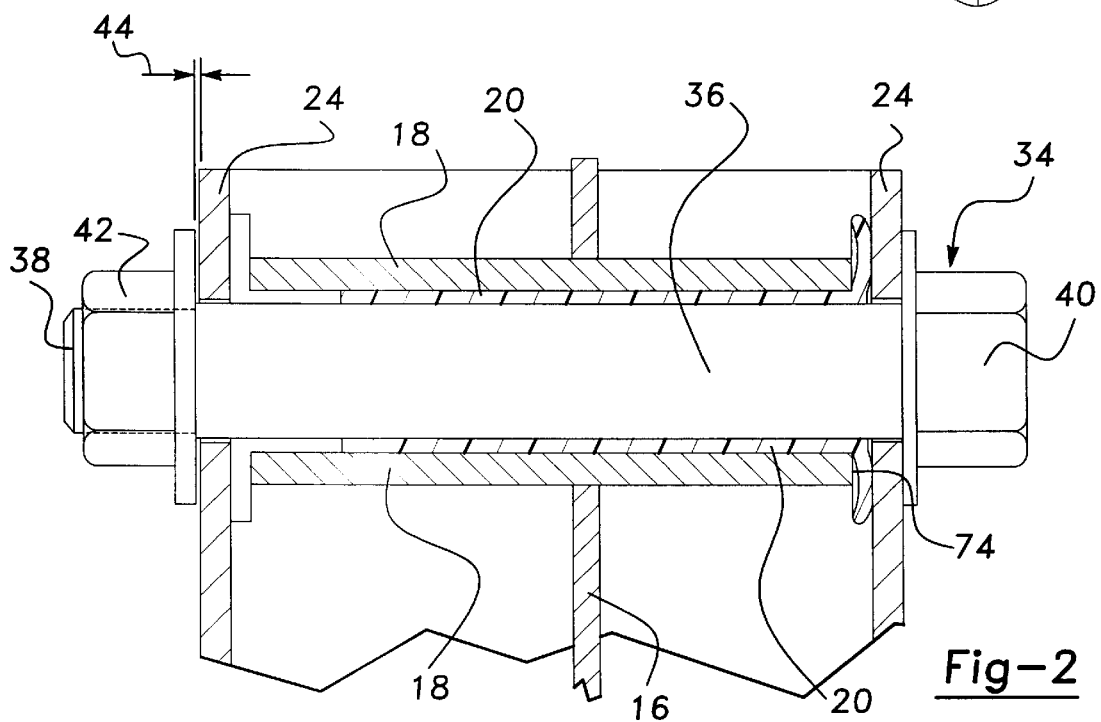
FIG. 2 is a cross-sectional view of a section of the brake pedal assembly shown as an assembled configuration.

Shoulder bolt 34 includes shoulder section 36, threaded section 38 at one end, and a head 40 at the other end. After shoulder bolt 34 is inserted, a nut 42 is threaded onto threaded section 38. Shoulder portion 36 of shoulder bolt 34 provides a stop for tightening nut 42. Thus, as shown in FIG. 2, shoulder bolt 40 cannot be over-tightened because shoulder section 36 provides a positive stop for nut 42. When nut 42 is fully tightened, a small gap 44 remains between the bottom of nut 42 and the outside of sidewall 24 of bracket 26.

FIGS. 3–7 provide various views of brake pedal spacer 20. Brake pedal spacer 20 is a generally cylindrically shaped, tubular apparatus. Cylindrical section 46 contacts the interior 22 of tubular member 18. Brake pedal spacer 20 also includes two pairs of opposing flats 48 which contact shoulder 36 of shoulder bolt 34. Flats 48 provide an interference fit between shoulder 36 and brake pedal spacer 20 in order to provide sufficient contact between brake pedal spacer 20 and shoulder 36 and to remove any play or slop between shoulder 36 and brake pedal spacer 20.

Figure 3:
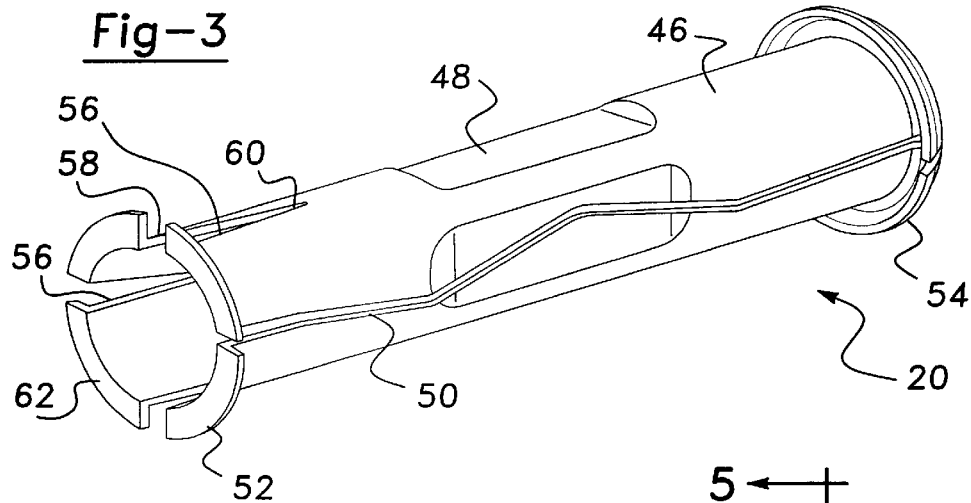
FIG. 3 is a perspective view of the brake pedal spacer arranged in accordance with the principles of the present invention.
Figure 4:
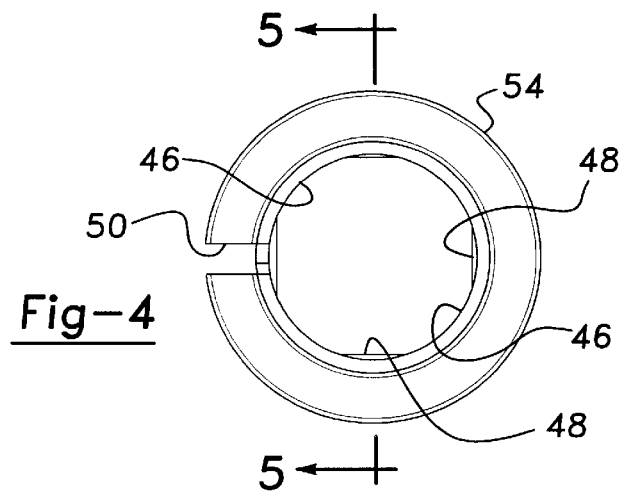
FIG. 4 is an end view of the stop end the brake pedal spacer of FIG. 3.
Figure 5:
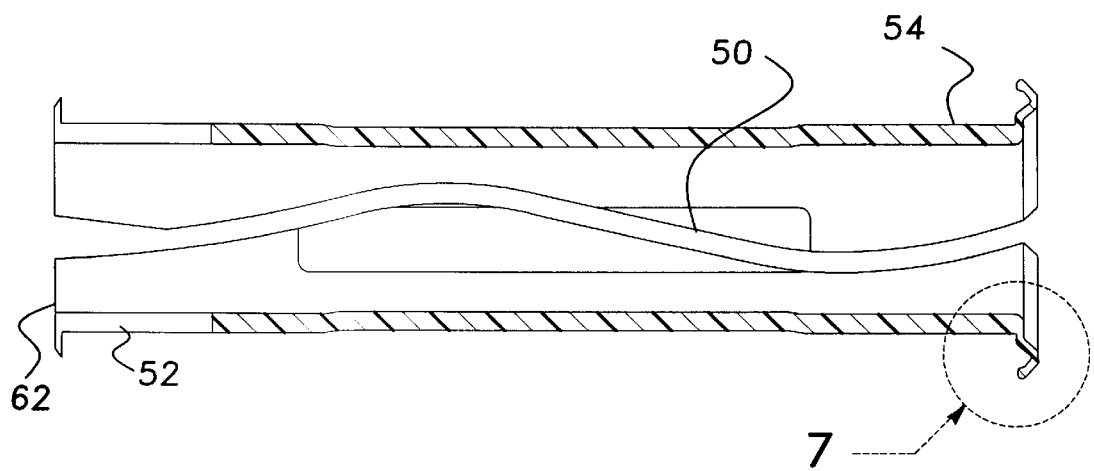
FIG. 5 is a cross-sectional view of the brake pedal spacer taken along the line 5—5 of FIG. 4.

An open channel 50 traverses the length of brake pedal spacer 20 so that brake pedal spacer 20 comprises an open ended cylinder with the open section of the cylinder defined by the open channel 50. In preferred embodiment, open channel 50 has a serpentine configuration as shown in FIGS. 3 and 5. The serpentine configuration provides several functional advantages. First, the serpentine configuration provided by open channel 50 enables limited twisting between entry end 52 and stop end 54. During operation, if the driver of the vehicle does not press evenly on foot pedal 14, one end of brake pedal spacer 20 may seize while the other end is free to move. This causes a twisting between ends 52 and 54. The serpentine configuration of open channel 50 enables twist between ends 52 and 54 so that such twist does not damage brake pedal spacer 20. In addition, the serpentine configuration of open channel 50, while providing for twist between ends 52 and 54, also limits the maximum amount of twist between the ends 52 and 54. The serpentine configuration narrows the width of open channel 50 during twisting so that ends of open channel 50 contact each other to limit the maximum amount of twist.

With particular reference to FIGS. 3 and 6, the entry end of brake pedal spacer 20 will be described. Entry end 52 is particularly designed for compression upon insertion through the cylindrical tube 18. Such compression is realized by forming a plurality of tapers 56 along the axial direction of brake pedal spacer 20. Tapers 56 define an open portion 58 along the edge of brake pedal spacer 20. The open portion angles toward a closed end 60. The entry end 52 also includes a lip 62 having a beveled edge 64, shown in FIG. 5. Beveled edge 64 facilitates insertion of the brake pedal spacer 20 through interior 22 of cylindrical tube 18. During insertion, the beveled edge 64 contacts the interior 22 of cylindrical tube 18 and tapers 56 compress to enable insertion of the entry end 52 of the brake pedal spacer into cylindrical tube 18. Brake pedal spacer 20 is inserted through cylindrical tube 18 so that lip 62 exits cylindrical tube 18 and provides a catch or stop so that the brake pedal spacer 20 cannot be backed out of the cylindrical tube 18.

At the opposite or the stop end 54, brake pedal spacer 20 includes a stop 66, shown in FIG. 7. Stop 66 engages a side of cylindrical tube 18 to prevent insertion of the brake pedal spacer 20 beyond the stop 66. Extending from stop 66 is a spring 68. Spring 68 includes an outer surface 70 which contacts the inner surface of sidewall 24 of brake pedal bracket 26. Spring 68 also includes an inner surface 72 which contacts sidewall 74, shown in FIG. 2, of cylindrical bore 18. Spring 68 reduces transverse movement of brake pedal 12 along axis 30. In addition, spring 68 maintains a constant spring pressure on the brake pedal through cylindrical bore 18 in order to further limit the transverse movement between the apertures 28.

In a preferred embodiment, brake pedal spacer 20 is formed of an acetal copolymer material, an example of which is known to those skilled in the art as CELCON M-90 produced by Hoechst Celanese. However, one skilled in the art will recognize that an acceptable material would be a plastic having a lubricous property so that the brake pedal spacer is self lubricating and need not be lubricated further and is also resistant to oils which may contact the brake pedal spacer 20. Optionally, the brake pedal spacer 20 can be coated in mineral oil to provide additional lubricous properties.

From the foregoing, it can be seen that the brake pedal spacer 20 provides a significant reduction in parts for assembling the brake pedal assembly 10 and significantly facilitates assembly of the brake pedal assembly 10. Further, the serpentine shape of open channel 50 enables twisting motion between entry end 52 and stop end 54 to enable satisfactory operation of the brake pedal upon unequal application of pressure to foot pad 14.

While the above detailed description describes the preferred embodiment of the present invention, it should be understood that the present invention is susceptible to modification, variation and alteration without deviating from the scope and fair meaning of the subjoined claims.

What is claimed is:

1. A vehicle brake pedal assembly comprising:
    a bracket having a pair of opposing apertures formed therein;
    a brake pedal including a foot pad and a rigid member extending from the foot pad, the rigid member having attached at an end opposite the foot pad a cylindrical bore, the bore being placed between said apertures and having an axis generally aligned with the apertures;
    a generally tubular brake pedal spacer inserted into a first end of the cylindrical bore and extending through to a second end of the cylindrical bore, the spacer having an axis generally aligned with the apertures and the cylindrical bore axis; and
    a shoulder bolt passing through the apertures and the spacer generally along the axis of the spacer to attach the brake pedal to the bracket.

2. The assembly of claim 1 wherein the brake pedal spacer has an open groove formed generally along the spacer axis, the open groove being flexible to enable a twisting motion of the spacer.

3. The assembly of claim 1 wherein the brake pedal spacer has a non-linear, open groove formed generally along the spacer axis, the open groove being flexible to enable a twisting motion of the spacer.

4. The assembly of claim 3 wherein the brake pedal spacer has flats formed in a portion of the spacer for contacting the shoulder bolt.

5. The assembly of claim 4 wherein the brake pedal spacer has an entry end which is inserted into the cylindrical bore to install the spacer within the cylindrical bore, the entry end having a plurality of tapers formed therein to allow compression of the entry end to facilitate insertion into the cylindrical bore, the entry end also having a retaining section to limit travel of the spacer within the cylindrical bore following installation.

6. The assembly of claim 5 wherein the end of the spacer opposite the entry end has a spring formed therein, the spring contacting a sidewall of the cylindrical bore and an inner surface of the bracket in proximity to one of said apertures, the spring maintaining tension between the spacer and the bracket and maintaining tension between the cylindrical bore and the bracket.

7. The assembly of claim 6 wherein the shoulder bolt has a shoulder section between a head and a threaded end, and the shoulder bolt extends through the brake pedal spacer, the shoulder section providing a stop for a nut threaded onto the threaded end.

8. The assembly of claim 7 wherein the shoulder section is sized to prevent over-tightening of the shoulder bolt.

9. A brake pedal spacer inserted between a generally tubular section of a brake pedal and a shoulder bolt having a shoulder portion inserted through the tubular section for attaching the brake pedal to a brake pedal bracket, comprising:

a pair of generally cylindrical sections generally aligned along a common axis, each section located in proximity to opposite ends of the brake pedal spacer, the cylindrical sections contacting an inner surface of the generally tubular section;

a second section located between and connecting the cylindrical sections, the second section having a plurality of flats for contacting the shoulder portion of the shoulder bolt; and an open groove generally formed along an axis of the brake pedal spacer, the open groove being flexible to allow twisting of the brake pedal spacer.

10. The brake pedal spacer of claim 9 wherein the spacer includes an entry end which is inserted through the tubular section to install the spacer within the tubular section, the entry end having a plurality of tapers formed therein to allow compression of the entry end to facilitate insertion into the tubular section, the entry end also having a retaining section to limit travel of the spacer within the tubular section following installation.

11. The brake pedal spacer of claim 10 wherein the end of the spacer opposite the entry end has a spring formed therein, the spring contacting a sidewall of the tubular section and an inner surface of the brake pedal bracket, the spring maintaining tension between the spacer and the bracket and maintaining tension between the tubular section and the bracket.

12. The brake pedal spacer of claim 9 wherein the open groove has a serpentine configuration.

\* \* \* \* \*